(12) United States Patent
Fine

(10) Patent No.: US 7,813,287 B2
(45) Date of Patent: Oct. 12, 2010

(54) FAST TV CHANNEL CHANGING IN IPTV NETWORK

(75) Inventor: Mark Fine, Salt Lake City, UT (US)

(73) Assignee: Alcatel Lucent, Paris (FR)

( * ) Notice: Subject to any disclaimer, the term of this patent is extended or adjusted under 35 U.S.C. 154(b) by 294 days.

(21) Appl. No.: 11/847,301

(22) Filed: Aug. 29, 2007

(65) Prior Publication Data

US 2009/0059911 A1    Mar. 5, 2009

(51) Int. Cl.
*G08C 15/00* (2006.01)

(52) U.S. Cl. ........................ 370/238; 709/230

(58) Field of Classification Search ................. 370/238
See application file for complete search history.

(56) References Cited

U.S. PATENT DOCUMENTS 6,950,853 B2 * 9/2005 Garcia-Luna-Aceves et al. .......................... 709/204

OTHER PUBLICATIONS

W. Fenner "Internet Group Management Protocol, Version 2", RFC 2236, Nov. 1997, pp. 1-24.
S. Deering et al. "Multicast Listener Discovery (MLD) for Ipv6", RFC 2710, Oct. 1999, pp. 1-22.
B. Cain et al. "Internet Group Management Protocol, Version 3", RFC 3376, Oct. 2002, pp. 1-53.
R. Vida et al. "Multicast Listener Discovery Version 2 (MLDv2) for IPv6", RFC 3810, Jun. 2004, pp. 1-62.

* cited by examiner

*Primary Examiner*—Jason E Mattis
*Assistant Examiner*—Stephen J Clawson
(74) *Attorney, Agent, or Firm*—Capitol Patent & Trademark Law Firm, PLLC

(57) ABSTRACT

A router and method are described herein that provide a "fast leave behavior" by instantly aging out group and source records that are associated with the IGMPv3/MLDv2 protocols. In one embodiment, the router and method are part of a triple play service network including a bandwidth-limited Internet Protocol Television (IPTV) network in which the instantly aging out of group and source records is desirable to implement a fast TV channel changing feature (or fast leave behavior).

16 Claims, 2 Drawing Sheets

FAST TV CHANNEL CHANGING IN IPTV NETWORK

TECHNICAL FIELD

The present invention is related to a router and method for providing a "fast leave behavior" by instantly aging out group and source records that are associated with the IGMPv3/MLDv2 protocols. In one embodiment, the router and method are part of a triple play service network including a bandwidth-limited Internet Protocol Television (IPTV) network in which the instantly aging out of group and source records is desirable to implement a fast TV channel changing feature (or fast leave behavior).

BACKGROUND

The following abbreviations are herewith defined, at least some of which are referred to in the following description associated with the prior art and the present invention.

| | |
|---|---|
| BTV | Broadcast Television |
| CO | Central Office |
| DSL | Digital Subscriber Line |
| DSLAM | Digital Subscriber Line Access Multiplexer |
| STB | Set-Top Box |
| TV | Television |
| VHO | Video Hub Office |

Telecommunication service providers are currently using a transport network to offer triple-play services, which include video (BTV), voice (telecommunications) and data (Internet) to homes via DSL phone lines or optical fibers. To accomplish this, the transport network needs to be able to provide a TV service which has an effective rapid TV channel change functionality. In particular, the transport network needs to be able to provide a TV service which has an effective fast TV channel leave functionality such that when a user who is watching TV decides to change the TV channel then the transport network is able to de-provision or "zap" the old TV channel fast and as a result conserve valuable bandwidth on the link connected to the user's STB. An exemplary traditional IPTV network 100 is discussed below to help explain why it is not possible to have an effective fast TV channel leave functionality when it utilizes components that implement the IGMPv3/MLDv2 protocols which are discussed in detail in the following documents:

B. Cain et al. "Internet Group Management Protocol, Version 3", RFC 3376, dated Oct. 2, 2002 (note: this standard is referred to herein as the IGMPv3 protocol).

R. Vida et al. "Multicast Listener Discovery Version 2 (MLDv2) for IPv6", RFC 3810, dated June 2004 (note: this standard is referred to herein as the MLDv2 protocol).

The contents of these two documents are incorporated by reference herein.

Referring to FIG. 1 (PRIOR ART), there is a block diagram illustrating the exemplary traditional IPTV network 100 which implements the current IGMPv3 protocol and/or the MLDv2 protocol and as a result does not have an effective fast TV channel leave functionality. As shown, the exemplary IPTV network 100 includes two super head-ends 102, a backbone network 104, multiple VHOs 106, multiple IOs 108, multiple COs 110, multiple SAIs 112 (which include routers 113) and multiple RGWs 114. In operation, each super head-end 102 receives international TV feeds and supplies those international TV feeds via the backbone network 104 to each VHO 106. Then, each VHO 106 receives local TV feeds and multicasts all of the TV feeds to their respective IO 108. And, each IO 108 multicasts all of the TV feeds to their respective CO 110. Then, each CO 110 multicasts all of the TV feeds to their respective SAI 112 (which includes a router 113). And, each SAI 112 then multicasts all or a portion of the TV feeds to their respective RGWs 114 each of which are connected to multiple STBs 116. As a result, the user can interface with their particular STB 116" and select one of the multicast TV channels to watch on their TV. The IPTV network 100 may also provide voice (telecommunications), video-conferencing (telecommunications) and data (Internet) to the homes via the DSL phone lines or optical fibers.

Unfortunately, the exemplary traditional IPTV network 100 and in particular the SAIs 112 (the routers 113) and the RGWs 114 implement the IGMPv3/MLDv2 protocols and their respective standardized state transition tables 118a and 118b. As such, the exemplary IPTV network 110 does not have an effective fast TV channel leave functionality which means that when a user who is watching TV decides to change the TV channel then the IPTV network 100 is not able to de-provision or "zap" the old TV channel fast and as a result wastes valuable bandwidth on the link connected to the user's STB 116'. This happens because the corresponding SAI 112' and in particular the router 113' have complex state machines 118a and 118b which makes it difficult if not impossible to provide an effective fast TV channel leave functionality (note: for clarity only one of the routers 113' has been shown to include the state machines 118a and 118b). The traditional state machine 118a which is associated with the IGMPv3 protocol is illustrated below in TABLE 1:

TABLE 1

| State Transition No. | Router State | Input from RGW 114 | New Router State | Actions |
|---|---|---|---|---|
| 1 | INCLUDE (A) | TO_IN (B) | INCLUDE (A + B) | (B) = GMI<br>Send Q(G, A − B) |
| 2 | EXLUDE (X, Y) | TO_IN (A) | EXCLUDE (X + A, Y − A) | (A) = GMI<br>Send Q(G, X − A)<br>Send Q(G) |
| 3 | INCLUDE (A) | TO_EX (B) | EXCLUDE (A * B, B − A) | (B − A) = 0<br>Delete (A − B)<br>Send Q(G, A * B)<br>Group Timer = GMI |

TABLE 1-continued

| State Transition No. | Router State | Input from RGW 114 | New Router State | Actions |
|---|---|---|---|---|
| 4 | EXCLUDE (X, Y) | TO_EX (A) | EXCLUDE (A − Y, Y * A) | (A − X − Y) = Group Timer<br>Delete (X − A)<br>Delete (Y − A)<br>Send Q (G, A − Y)<br>Group Timer = GMI |
| 5 | INCLUDE (A) | BLOCK (B) | INCLUDE (A) | Send Q(G, A * B) |
| 6 | EXCLUDE (X, Y) | BLOCK (A) | EXCLUDE (X + (A − Y), Y) | (A − X − Y) = Group Timer<br>Send Q(G, A − Y) |
| 7 | INCLUDE (A) | ALLOW (B) | INCLUDE (A + B) | (B) = GMI |
| 8 | EXCLUDE (X, Y) | ALLOW (A) | EXLUDE (X + A, Y − A) | (A) = GMI |

And, the traditional state machine 118b which is associated with the MLDv2 protocol is illustrated below in TABLE 2:

TABLE 2

| State Transition No. | Router State | Input from RGW 114 | New Router State | Actions |
|---|---|---|---|---|
| 1 | INCLUDE (A) | TO_IN (B) | INCLUDE (A + B) | (B) = MALI<br>Send Q(MA, A − B) |
| 2 | EXLUDE (X, Y) | TO_IN (A) | EXCLUDE (X + A, Y − A) | (A) = MALI<br>Send Q(MA, X − A)<br>Send Q(MA) |
| 3 | INCLUDE (A) | TO_EX (B) | EXCLUDE (A * B, B − A) | (B − A) = 0<br>Delete (A − B)<br>Send Q(MA, A * B)<br>Filter Timer = MALI |
| 4 | EXCLUDE (X, Y) | TO_EX (A) | EXCLUDE (A − Y, Y * A) | (A − X − Y) = Filter Timer<br>Delete (X − A)<br>Delete (Y − A)<br>Send Q (MA, A − Y)<br>Filter Timer = MALI |
| 5 | INCLUDE (A) | BLOCK (B) | INCLUDE (A) | Send Q(MA, A * B) |
| 6 | EXCLUDE (X, Y) | BLOCK (A) | EXCLUDE (X + (A − Y), Y) | (A − X − Y) = Filter Timer<br>Send Q(MA, A − Y) |
| 7 | INCLUDE (A) | ALLOW (B) | INCLUDE (A + B) | (B) = MALI |
| 8 | EXCLUDE (X, Y) | ALLOW (A) | EXLUDE (X + A, Y − A) | (A) = MALI |

A detailed discussion about these traditional state machines 118a and 118b and each of their messages, states and actions is provided in the aforementioned documents associated with the IGMPv3/MLDv2 protocols. The main problem with these traditional state machines 118a and 118b is that when the router 113' receives a message 120 (e.g., TO_IN (B)) from the RGW 114' (or the remote network element 114') then in order to perform a state transition it may need to send a query Q 122 (e.g., Send Q(G, A–B)) to the RGW 114' where the time associated with sending the query Q 122 and then waiting for a response from the RGW 114' is problematical in an IPTV application where such a delay adversely affects the fast TV channel leave functionality. Accordingly, there has been and is a need for a router that has enhanced state machines which conserve bandwidth in an IPTV network by rapidly de-provisioning or "zapping" old TV channels. This need and other needs are satisfied by the router and method of the present invention.

SUMMARY

In one aspect, the present invention provides a router which can instantly age-out group and source records in a state transition table. The router performs the steps of: (a) receiving a Change-to-Include-Mode message from a remote network element; (b) performing one or more actions based on a first old state and the Change-to-Include-Mode message to obtain a first new state where neither of the one or more actions required sending a query to the remote network element; and (c) updating the first old state to the first new state in the state transition table where the transition from the first old state to the first new state instantly aged-out at least a portion of the group and source records that where associated with the first old state. The router can also perform similar steps upon receiving a Change-to-Exclude-Mode message or a Block-Old-Sources message from the remote network element.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
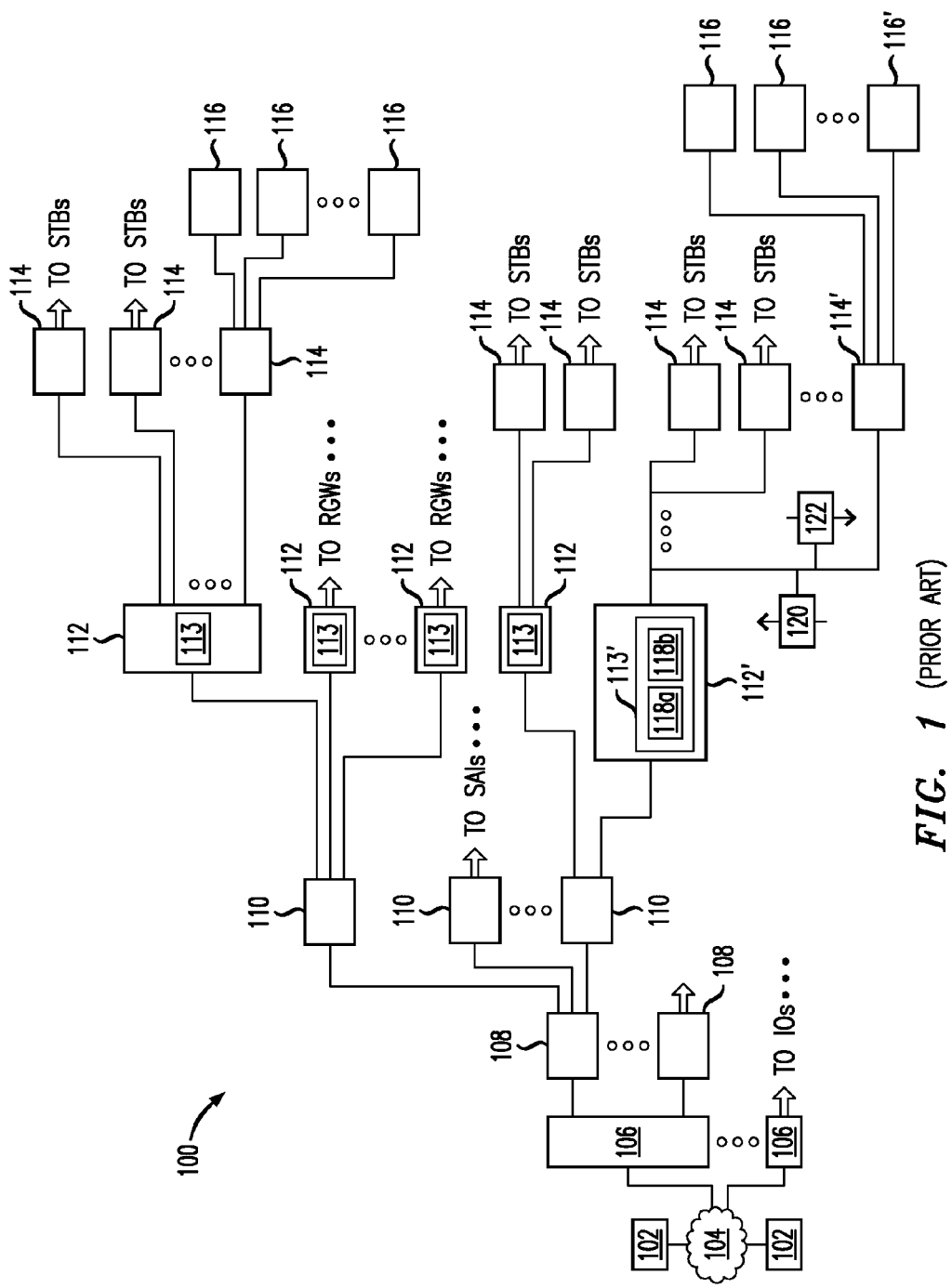
FIG. 1 (PRIOR ART) is a block diagram illustrating an exemplary traditional IPTV network which has traditional routers implementing the standardized state transition tables associated with the IGMPv3 and MLDv2 protocols and as a result the routers do not have an effective fast TV channel leave functionality.
Figure 2:
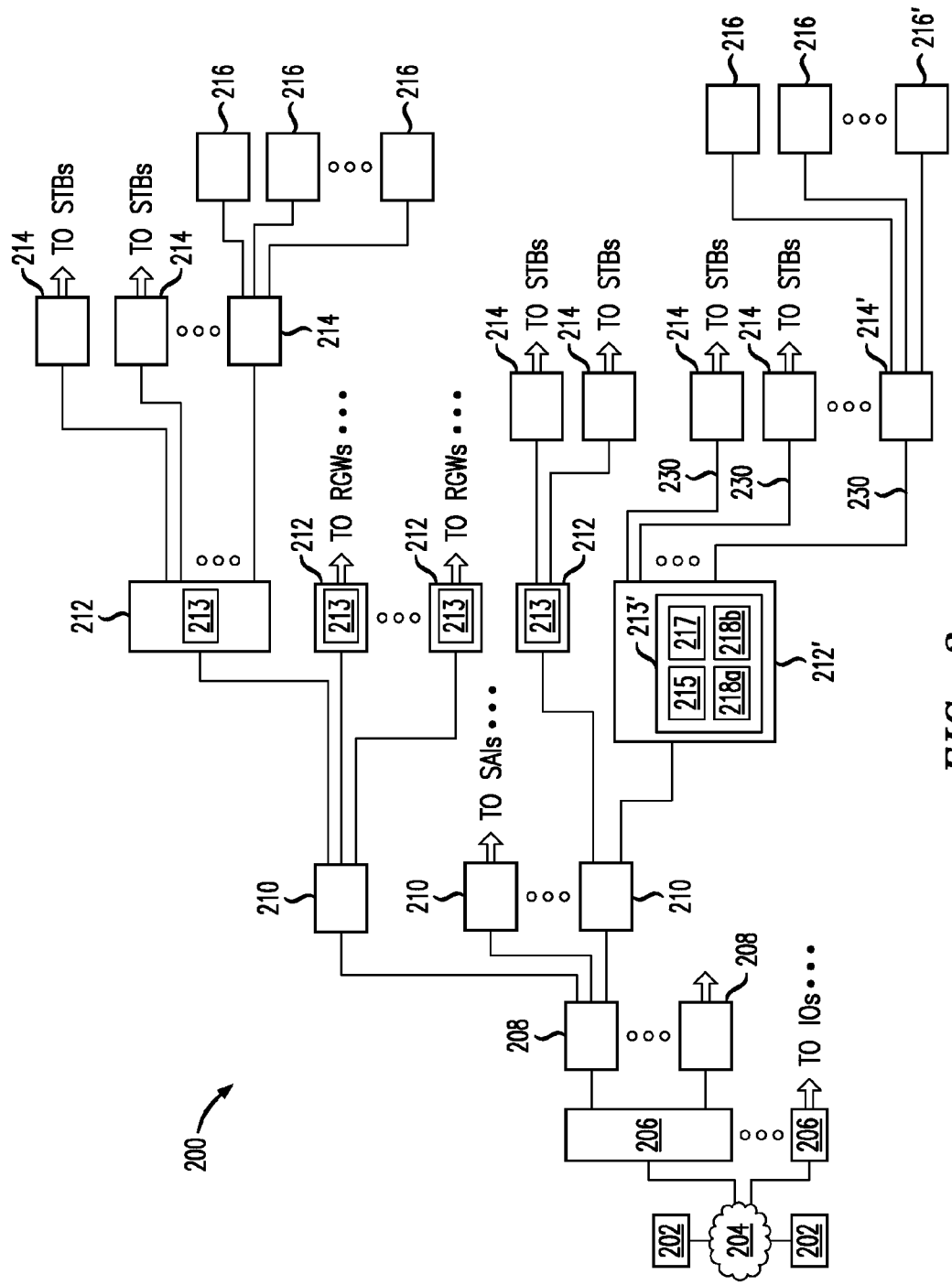
FIG. 2 is a block diagram of an exemplary IPTV network which has routers implementing enhanced state transition tables that can be associated with the IGMPv3 and MLDv2 protocols and as a result the routers have an effective fast TV channel leave functionality in accordance with the present invention.

Referring to FIG. 2, there is a block diagram illustrating an exemplary IPTV network 200 which has routers 213 implementing one or more enhanced state transition tables 218a and 218b that can be associated with the IGMPv3/MLDv2 protocols and as a result the routers 213 have an effective fast TV channel leave functionality in accordance with the present invention. As shown, the exemplary IPTV network 200 includes two super head-ends 202, a backbone network 204, multiple VHOs 206, multiple IOs 208, multiple COs 210, multiple SAIs 212 (which include the enhanced routers 213) and multiple RGWs 214. In operation, each super head-end 202 receives international TV feeds and supplies those international TV feeds via the backbone network 204 to each VHO 206. Then, each VHO 206 receives local TV feeds and multicasts all of the TV feeds to their respective IO 208. And, each IO 208 multicasts all of the TV feeds to their respective CO 210. Then, each CO 210 multicasts all of the TV feeds to their respective SAI 212 (which includes the enhanced routers 213). And, each SAI 212 then multicasts all or a portion of the TV feeds to their respective RGWs 214 each of which are connected to multiple STBs 216. As a result, the user can interface with their particular STB 216' and select one of the multicast TV channels to watch on their TV. The IPTV network 200 may also provide voice (telecommunications), video-conferencing (telecommunications) and data (Internet) to the homes via the DSL phone lines or optical fibers.

The exemplary IPTV network 200 and in particular the SAIs 212 (the enhanced routers 213) and their RGWs 114 implement the enhanced state transition tables 218a and 218b and as a result the routers 213 have an effective fast TV channel leave functionality such that when a user who is watching TV decides to change the TV channel then the IPTV network 200 is able to de-provision or "zap" the old TV channel fast and as a result conserve valuable bandwidth on the link connected to the user's STB 216'. This is possible because the corresponding SAI 212' and in particular the enhanced router 213' which has a memory 215 with instructions stored therein that are accessible and processable by a processor 217 can instantly age-out group and source records within the enhanced state machines 218a and 218b (discussed in detail below). The enhanced state machine 218a which is associated with the IGMPv3 protocol is illustrated below in TABLE 3:

TABLE 3

| No. | Old State | Input | New State | Actions |
|---|---|---|---|---|
| 1 | INCLUDE (A) | TO_IN (B) | INCLUDE (B) | (B) = GMI<br>DELETE (A − B) |
| 2 | EXCLUDE (X, Y) | TO_IN (A) | INCLUDE (A) | (A) = GMI<br>DELETE (X − A)<br>DELETE (Y − A)<br>Group Timer = 0 |
| 3 | INCLUDE (A) | TO_EX (B) | EXCLUDE (NULL, B) | (B) = 0<br>DELETE (A − B)<br>Group Timer = GMI |
| 4 | EXCLUDE (X, Y) | TO_EX (A) | EXCLUDE (NULL, A) | (A) = 0<br>DELETE (X − A)<br>DELETE (Y − A)<br>Group Timer = GMI |
| 5 | INCLUDE (A) | BLOCK (B) | INCLUDE (A − B) | DELETE (A * B) |
| 6 | EXCLUDE (X, Y) | BLOCK (A) | EXCLUDE (X − A, A + Y) | (A − Y) = 0 |
| 7 | INCLUDE (A) | ALLOW (B) | INCLUDE (A + B) | (B) = GMI |
| 8 | EXCLUDE (X, Y) | ALLOW (A) | EXLUDE (X + A, Y − A) | (A) = GMI |

And, the enhanced state machine 218b which is associated with the MLDv2 protocol is illustrated below in TABLE 4:

TABLE 4

| No. | Old State | Input | New State | Actions |
|---|---|---|---|---|
| 1 | INCLUDE (A) | TO_IN (B) | INCLUDE (B) | (B) = MALI<br>DELETE (A − B) |

TABLE 4-continued

| No. | Old State | Input | New State | Actions |
|---|---|---|---|---|
| 2 | EXCLUDE (X, Y) | TO_IN (A) | INCLUDE (A) | (A) = MALI |
|   |   |   |   | DELETE (X - A) |
|   |   |   |   | DELETE (Y - A) |
|   |   |   |   | Filter Timer = 0 |
| 3 | INCLUDE (A) | TO_EX (B) | EXCLUDE (NULL, B) | (B) = 0 |
|   |   |   |   | DELETE (A - B) |
|   |   |   |   | Filter Timer = MALI |
| 4 | EXCLUDE (X, Y) | TO_EX (A) | EXCLUDE (NULL, A) | (A) = 0 |
|   |   |   |   | DELETE (X - A) |
|   |   |   |   | DELETE (Y - A) |
|   |   |   |   | Filter Timer = MALI |
| 5 | INCLUDE (A) | BLOCK (B) | INCLUDE (A - B) | DELETE (A * B) |
| 6 | EXCLUDE (X, Y) | BLOCK (A) | EXCLUDE (X - A, A + Y) | (A - Y) = 0 |
| 7 | INCLUDE (A) | ALLOW (B) | INCLUDE (A + B) | (B) = MALI |
| 8 | EXCLUDE (X, Y) | ALLOW (A) | EXLUDE (X + A, Y - A) | (A) = MALI |

Note 1: The router 213 to properly implement the enhanced state transition tables 218a and 218b needs to communicate with a single network element 214 (RGW 214) per each link segment 230 (see FIG. 2).

Note 2: The router 213 can implement enhanced state transition tables 218a and 218b in other applications besides the IPTV application so long as the router 213 has one remote network element 214 connected to it via a single link segment 230.

Note 3: The state transition nos. 1-6 in TABLES 3 and 4 are different than the station transition nos. 1-6 in TABLES 1 and 2. Wile, state transition nos. 7-8 in TABLES 3 and 4 are the same as the station transition nos. 7-8 in TABLES 1 and 2.

Note 4: The enhanced state transition tables 218a and 218b have some minor terminology differences but they are effectively the same. Thus, for brevity, the discussion provided below will be based on state transition table 218a.

To help describe the enhanced state machines 218a and 218b herein some of the relevant terminology and definitions from the IGMPv3/MLDv2 protocols have been provided as follows:

CHANGE_TO_INCLUDE_MODE—indicates that the interface has changed to INCLUDE filter mode for the specified multicast address. The Source Address [i] fields in this Group Record contain the interface's new source list for the specified multicast address, if it is non-empty.

CHANGE_TO_EXCLUDE_MODE—indicates that the interface has changed to EXCLUDE filter mode for the specified multicast address. The Source Address [i] fields in this Group Record contain the interface's new source list for the specified multicast address, if it is non-empty.

ALLOW_NEW_SOURCES—indicates that the Source Address [i] fields in this Group Record contain a list of the additional sources that the system wishes to hear from, for packets sent to the specified multicast address. If the change was to an INCLUDE source list, these are the addresses that were added to the list; if the change was to an EXCLUDE source list, these are the addresses that were deleted from the list.

BLOCK_OLD_SOURCES—indicates that the Source Address [i] fields in this Group Record contain a list of the sources that the system no longer wishes to hear from, for packets sent to the specified multicast address. If the change was to an INCLUDE source list, these are the addresses that were deleted from the list; if the change was to an EXCLUDE source list, these are the addresses that were added to the list.

In addition, the following notation is used to describe the contents of a Group Record which pertains to a particular multicast address:

IS_IN (x)—Type MODE_IS_INCLUDE, source addresses x

IS_EX (x)—Type MODE_IS_EXCLUDE, source addresses x

TO_IN (x)—Type CHANGE_TO_INCLUDE_MODE, source addresses x

TO_EX (x)—Type CHANGE_TO_EXCLUDE_MODE, source addresses x

ALLOW (x)—Type ALLOW_NEW_SOURCES, source addresses x

BLOCK (x)—Type BLOCK_OLD_SOURCES, source addresses x where "x" is either a capital letter (e.g., "A") to represent the set of source addresses, or a set expression (e.g., "A+B") where "A+B" means the union of sets A and B, "A*B" means the intersection of sets A and B, and "A−B" means the removal of all elements of set B from set A.

Plus, prior to discussing the enhanced state transition table 218a in detail, an example is discussed next to help explain how the router 213' can use the state transition table 218a to enable a user to interact with their STB 216' and change from one TV channel (GolfTV) to another TV channel (ESPN channel). In this example:

Step 1: Assume:
G1=GolfTV multicast group (i.e., channel)
G2=ESPN multicast group (i.e., channel)
S1=GolfTV multicast server (i.e., source)
S2=ESPN multicast server (i.e., source)

Step 2: The user is watching GolfTV and the router 213 has the current state: INCLUDE (G1, S1).

Step 3: The user leaves the GolfTV channel and then the RGW 214' (via STB 216') sends the router 213 the following report: BLOCK (G1, S1).

Step 4: The router 213 performs the following action DELETE (G1, S1) and the router's new state will be INCLUDE (G1,NULL) which is equivalent to removing the record for G1 (see state transition no. 5 in TABLE 3).

Step 5: The user joins the ESPN channel and then the RGW 214' (via STB 216') sends the router 213 the following report: ALLOW (G2, S2)

Step 6: The router 213 performs the following action (G2, S2)=GMI (which indicates start a timer for each source in set S2) and now the router's new state will be INCLUDE (G2, S2) (see state transition no. 7 in TABLE 3).

Note 1: The "default" state for every group is INCLUDE (G, NULL) and when a new record is created then the state machine 218*a* starts with this "default" state and when a record reaches this state it can then be deleted.

Note 2: The terms INCLUDE (G1, S1), BLOCK (G1, S1), ALLOW (G2, S2) would normally be represented as INCLUDE (S1), BLOCK (S1) and ALLOW (S2) in the enhanced state transition tables 218*a* and 218*b* where G1 and G2 are not explicitly shown therein.

Referring to state transition no. 1 in the state transition table 218*a*, the router 213' and in particular the processor 217 accesses and processes instructions stored in memory 215 to instantly age-out group and source records when it receives a TO_IN (B) message from the RGW 214' which requests a change_to_include_mode for sources in set B and when an old state within the router 213' is INCLUDE (A) which indicate sources in set A are currently allowed to interface with the RGW 214' then the processor 217 performs the following actions: (1) set (B)=GMI which indicates start a timer for each source in set B and (2) DELETE (A−B) which indicates remove any source in set A that is not in set B. After performing these two actions, the state transition table 218*a* would have a new state INCLUDE (B) which indicates sources in set B are now currently allowed to interface with the RGW 214' via the single link segment 230.

In comparing this state transition no. 1 to the traditional state transition no. 1 in TABLE 1, it can be seen that the router 213' does not perform the time consuming action Send Q(G, A−B) where a query would be sent to the RGW 214'. The traditional state transition table 118*a* needs the action Send Q(G, A−B) because it was setup to take into account the possibility that the traditional router 113 may have a single link segment host multiple remote network elements (multiple RGWs 114). As discussed above, the exemplary IPTV network 200 has routers 213 that have a single link segment 230 hosting a single remote network element (RGW 214') (see FIG. 2). Hence, the enhanced state transition table 218*a* can be made less complex by not having to send queries because it is assumed that the router 213' has one RGW 214' connected to it via a single link segment 230. It should be noted that the new states within the traditional state transition table 118*a* would after a certain amount of time look like the new states in the enhanced state transition table 118*a* but it is important to eliminate this certain amount of time as is done by the present invention to enable the fast TV channel changing feature.

Referring to state transition no. 2 in the state transition table 218*a*, the router 213' and in particular the processor 217 accesses and processes instructions stored in memory 215 to instantly age-out group and source records when it receives a TO_IN (A) message from the RGW 214' which indicates a change_to_include_mode for sources in set A and when an old state within the router 213' is EXCLUDE (X, Y) which indicates that sources in set Y are currently excluded from interfacing with the RGW 214' while sources in set X are currently allowed to interface with the RGW 214' then the processor 217 performs the following actions: (1) set (A)=GMI which indicates start a timer for each source in A, (2) DELETE (X−A) which indicates remove any source in set X that is not in set A, (3) DELETE (Y−A) which indicates remove any source in set Y that is not in set A, and (4) set Group Timer=0 which indicates remove timer of group records G. After performing these four actions, the state transition table 218*a* would have a new state INCLUDE (A) which indicates sources in set A are now currently allowed to interface with the RGW 214'. In comparing this state transition no. 2 to the traditional state transition no. 2 in TABLE 1, it can be seen that the router 213' does not perform the actions Send Q(G, X−A) and Send Q(G) where these queries take time to complete and are not necessary in the present invention since the router 213' is connected to a single RGW 214' via a single link segment 230.

Referring to state transition no. 3 in the state transition table 218*a*, the router 213' and in particular the processor 217 accesses and processes instructions stored in memory 215 to instantly age-out group and source records when it receives a TO_EX (B) message from the RGW 214' which indicates a change_to_exclude_mode for sources in set B and when an old state within the router 213' is INCLUDE (A) which indicate sources in set A are currently allowed to interface with the RGW 214' then the processor 217 performs the following actions: (1) set (B)=0 which indicates remove timer for sources in set B; (2) DELETE (A−B) which indicates remove any source in set A that is not in set B, and (3) set Group Timer=GMI which indicates start a timer for group records G. After performing these three actions, the state transition table 218*a* would have a new state EXCLUDE (NULL, B) which indicates that sources in set B are currently excluded from interfacing with the RGW 214' and no sources are currently allowed to interface with the RGW 214'. In comparing this state transition no. 3 to the traditional state transition no. 3 in TABLE 1, it can be seen that the router 213' does not perform the action Send Q(G, A*B) where this query takes time to complete and is not necessary in the present invention since the router 213' is connected to a single RGW 214' via a single link segment 230.

Referring to state transition no. 4 in the state transition table 218*a*, the router 213' and in particular the processor 217 accesses and processes instructions stored in memory 215 to instantly age-out group and source records when it receives a TO_EX (A) message from the RGW 214' which indicates change_to_exclude_mode for sources in set A and when an old state within router 213' is EXCLUDE (X, Y) which indicates that sources in set Y are currently excluded from interfacing with the RGW 214' while sources in set X are currently allowed to interface with the RGW 214' then the processor 217 performs the following actions: (1) set (A)=0 which indicates remove timer for sources in set A; (2) DELETE (X−A) which indicates remove any source in set X that is not in set A, (3) DELETE (Y−A) which indicates remove any source in set Y that is not in set A, and (4) set Group Timer=GMI which indicates start a timer for group records G. After performing these four actions, the state transition table 218*a* would have a new state EXCLUDE (NULL, A) which indicates that sources in set A are currently excluded from interfacing with the RGW 214' and no sources are currently allowed to interface with the RGW 214'. In comparing this state transition no. 4 to the traditional state transition no. 4 in TABLE 1, it can be seen that the router 213' does not perform the action Send Q(G, A−Y) where this query takes time to complete and is not necessary in the present invention since the router 213' is connected to a single RGW 214' via a single link segment 230.

Referring to state transition no. 5 in the state transition table 218*a*, the router 213' and in particular the processor 217 accesses and processes instructions stored in memory 215 to instantly age-out group and source records when it receives a BLOCK (B) message from the RGW 214' which indicates block_old_sources for sources in set B and when an old state with router 213' is INCLUDE (A) which indicate sources in set A are currently allowed to interface with the RGW 214' then the processor 217 performs the following action (1) DELETE (A*B) which indicates remove any source in an intersection of set A and set B. After performing this action, the state transition table 218a would have a new state INCLUDE (A−B) which indicates that sources in set A but not in set B are currently allowed to interface with the RGW 214'. In comparing this state transition no. 5 to the traditional state transition no. 5 in TABLE 1, it can be seen that the router 213 does not perform the action Send Q(G, A*B) where this query takes time to complete and is not necessary in the present invention since the router 213 is connected to a single RGW 214' via a single link segment 230.

Referring to state transition no. 6 in the state transition table 218a, the router 213' and in particular the processor 217 accesses and processes instructions stored in memory 215 to instantly age-out group and source records when it receives a BLOCK (A) message from the RGW 214' which indicates block_old_sources for sources in set A and when an old state within router 213' is EXCLUDE (X, Y) which indicates that sources in set Y are currently excluded from interfacing with RGW 214' while sources in set X are currently allowed to interface with the RGW 214' then the processor 217 performs the action set (A−Y)=0 which indicates remove timer for sources in set A but not in set Y. After performing this action, the state transition table 218a would have a new state EXCLUDE (X−A, A+Y) which indicates that sources in sets A and Y are currently excluded from interfacing with the RGW 214' and sources in set X but not in set A are currently allowed to interface with the RGW 214'. In comparing this state transition no. 6 to the traditional state transition no. 6 in TABLE 1, it can be seen that the router 213' does not perform the action Send Q(G, A−Y) where this query takes time to complete and is not necessary in the present invention since the router 213' is connected to a single RGW 214' via a single link segment 230.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A method for instantly aging-out group and source records in a state transition table located within a router, said method comprising the steps of:
receiving a Change-to-Include-Mode message from a remote network element;
performing one or more actions based on a first old state and the Change-to-Include-Mode message to obtain a first new state where neither of the one or more actions required that a query be sent to the remote network element;
updating the first old state to the first new state in the state transition table where the transition from the first old state to the first new state instantly aged-out at least a portion of the group and source records associated with the first old state;
receiving a Change-to-Exclude-Mode message from the remote network element;
performing one or more actions based on a second old state and the Change-to-Exclude-Mode message to obtain a second new state where neither of the one or more actions required that a query be sent to the remote network element; and
updating the second old state to the second new state in the state transition table where the transition from the second old state to the second new state instantly aged-out at least a portion of the group and source records associated with the second old state.

2. A method for instantly aging-out group and source records in a state transition table located within a router, said method comprising the steps of:
receiving a Change-to-Include-Mode message from a remote network element;
performing one or more actions based on a first old state and the Change-to-Include-Mode message to obtain a first new state where neither of the one or more actions required that a query be sent to the remote network element;
updating the first old state to the first new state in the state transition table where the transition from the first old state to the first new state instantly aged-out at least a portion of the group and source records associated with the first old state;
receiving a Block-Old-Sources message from the remote network element;
performing one or more actions based on a third old state and the Block-Old-Sources message to obtain a third new state where neither of the one or more actions required that a query be sent to the remote network element; and
updating the third old state to the third new state in the state transition table where the transition from the third old state to the third new state instantly aged-out at least a portion of the group and source records associated with the third old state.

3. The method of claim 2, wherein said router implements an IGMPv3 protocol and has a link segment which hosts only the remote network element.

4. The method of claim 2, wherein said router implements a MLDv2 protocol and has a link segment which hosts only the remote network element.

5. A router, comprising:
a processor;
a memory; and
instructions which are accessible from said memory and processable by said processor to instantly age-out group and source records by receiving a TO_IN (B) message from a remote network element where the TO_IN (B) message indicates a change_to_include_mode for sources in set B and when an old state is INCLUDE (A) which indicate sources in set A are currently allowed to interface with the remote network element then apply actions:
(1) set (B)=GMI/MALI which indicates start a timer for each source in set B and
(2) DELETE (A−B) which indicates remove any source in set A that is not in set B, where after applying these two actions a state transition table would have a new state INCLUDE (B) which indicates sources in set B are now currently allowed to interface with the remote network element.

6. The router of claim 5, wherein said processor is further able to instantly age-out group and source records when receiving a TO_IN (A) message from the remote network element where the TO_IN (A) message indicates change_to_include_mode for sources in set A and when an old state is EXCLUDE (X, Y) which indicates that sources in set Y are currently excluded from interfacing with the remote network element while sources in set X are currently allowed to interface with the remote network element then apply actions:
- (1) set (A)=GMI/MALI which indicates start a timer for each source in set A,
- (2) DELETE (X−A) which indicates remove any source in set X that is not in set A,
- (3) DELETE (Y−A) which indicates remove any source in set Y that is not in set A, and
- (4) set Group Timer/Filter Timer=0 which indicates remove timer of group records G, where after applying these four actions the state transition table would have a new state INCLUDE (A) which indicates sources in set A are now currently allowed to interface with the remote network element.

7. The router of claim 5, wherein said processor is further able to instantly age-out group and source records when receiving a TO_EX (B) message from the remote network element where the TO_EX (B) (B) message indicates a change_to_exclude_mode for sources in set B and when an old state is INCLUDE (A) which indicate sources in set A are currently allowed to interface with the remote network element then apply actions:
- (1) set (B)=0 which indicates remove timer for sources in set B;
- (2) DELETE (A−B) which indicates remove any source in set A that is not in set B, and
- (3) set Group Timer/Filter Timer=GMI/MALI which indicates start a timer for group records G, where after applying these three actions the state transition table would have a new state EXCLUDE (NULL, B) which indicates that sources in set B are currently excluded from interfacing with the remote network element and no sources are currently allowed to interface with the remote network element.

8. The router of claim 5, wherein said processor is further able to instantly age-out group and source records when receiving a TO_EX (A) message from the remote network element where the TO_EX (A) message indicates a change_to_exclude_mode for sources in set A and when an old state is EXCLUDE (X, Y) which indicates that sources in set Y are currently excluded from interfacing with the remote network element while sources in set X are currently allowed to interface with the remote network element then apply actions:
- (1) set (A)=0 which indicates remove timer for sources in set A;
- (2) DELETE (X−A) which indicates remove any source in set X that is not in set A,
- (3) DELETE (Y−A) which indicates remove any source in set Y that is not in set A, and
- (4) set Group Timer/Filter Timer=GMI/MALI which indicates start a timer for group records G, where after applying these four actions the state transition table would have a new state EXCLUDE (NULL, A) which indicates that sources in set A are currently excluded from interfacing with the remote network element and no sources are currently allowed to interface with the remote network element.

9. The router of claim 5, wherein said processor is further able to instantly age-out group and source records when receiving a BLOCK (B) message from the remote network element where the BLOCK (B) message indicates block_old_ sources for sources in set B and when an old state is INCLUDE (A) which indicate sources in set A are currently allowed to interface with a remote network element then apply action:
- (1) DELETE (A*B) which indicates remove any source in an intersection of set A and set B, where after applying the action the state transition table would have a new state INCLUDE (A−B) which indicates that sources in set A but not in set B are currently allowed to interface with the remote network element.

10. The router of claim 5, wherein said processor is further able to instantly age-out group and source records when receiving a BLOCK (A) message from the remote network element where the BLOCK (A) message indicates block_old_ sources for sources in set A and when an old state is EXCLUDE (X, Y) which indicates that sources in set Y are currently excluded from interfacing with the remote network element while sources in set X are currently allowed to interface with the remote network element then apply action:
- (1) set (A−Y)=0 which indicates remove timer for sources in set A but not in set Y, where after applying the action the state transition table would have a new state EXCLUDE (X−A, A+Y) which indicates that sources in sets A and Y are currently excluded from interfacing with the remote network element and sources in set X but not in set A are currently allowed to interface with the remote network element.

11. A method for instantly aging-out group and source records in a state transition table, said method comprising the steps of receiving a TO_IN (B) message from a remote network element where the TO_IN (B) message indicates a change_to_include_mode for sources in set B and when an old state is INCLUDE (A) which indicate sources in set A are currently allowed to interface with the remote network element then applying actions:
- (1) setting (B)=GMI/MALI which indicates start a timer for each source in set B and
- (2) DELETE (A−B) which indicates remove any source in set A that is not in set B, where after applying these two actions a state transition table would have a new state INCLUDE (B) which indicates sources in set B are now currently allowed to interface with the remote network element.

12. The method of claim 11, further comprising the steps of receiving a TO_IN (A) message from the remote network element where the TO_IN (A) message indicates a change_to_include_mode for sources in set A and when an old state is EXCLUDE (X, Y) which indicates that sources in set Y are currently excluded from interfacing with the remote network element while sources in set X are currently allowed to interface with the remote network element then applying actions:
- (1) setting (A)=GMI/MALI which indicates start a timer for each source in set A,
- (2) DELETE (X−A) which indicates remove any source in set X that is not in set A,
- (3) DELETE (Y−A) which indicates remove any source in set Y that is not in set A, and
- (4) setting Group Timer/Filter Timer=0 which indicates remove timer of group records G, where after applying these four actions the state transition table would have a new state INCLUDE (A) which indicates sources in set A are now currently allowed to interface with the remote network element.

13. The method of claim 11, further comprising the steps of receiving a TO_EX (B) message from the remote network element where the TO_EX (B) message indicates change_to_exclude_mode for sources in set B and when an old state is INCLUDE (A) which indicate sources in set A are currently allowed to interface with the remote network element then applying actions:

(1) setting (B)=0 which indicates remove timer for sources in set B;

(2) DELETE (A−B) which indicates remove any source in set A that is not in set B, and (3) setting Group Timer/Filter Timer=GMI/MALI which indicates start a timer for group records G, where after applying these three actions the state transition table would have a new state EXCLUDE (NULL, B) which indicates that sources in set B are currently excluded from interfacing with the remote network element and no sources are currently allowed to interface with the remote network element.

14. The method of claim 11, further comprising the steps of receiving a TO_EX (A) message from the remote network element where the TO_EX (A) message indicates change_to_exclude_mode for sources in set A and when an old state is EXCLUDE (X, Y) which indicates that sources in set Y are currently excluded from interfacing with the remote network element while sources in set X are currently allowed to interface with the remote network element then applying actions:

(1) setting (A)=0 which indicates remove timer for sources in set A;

(2) DELETE (X−A) which indicates remove any source in set X that is not in set A, (3) DELETE (Y−A) which indicates remove any source in set Y that is not in set A, and (4) setting Group Timer/Filter Timer=GMI/MALI which indicates start a timer for group records G, where after applying these four actions the state transition table would have a new state EXCLUDE (NULL, A) which indicates that sources in set A are currently excluded from interfacing with the remote network element and no sources are currently allowed to interface with the remote network element.

15. The method of claim 11, further comprising the steps of receiving a BLOCK (B) message from the remote network element where the BLOCK (B) message indicates block_old_ sources for sources in set B and when an old state is INCLUDE (A) which indicate sources in set A are currently allowed to interface with a remote network element then applying action (1) DELETE (A*B) which indicates remove any source in an intersection of set A and set B, where after applying the action the state transition table would have a new state INCLUDE (A−B) which indicates that sources in set A but not in set B are currently allowed to interface with the remote network element.

16. The method of claim 11, further comprising the steps of receiving a BLOCK (A) message from the remote network element where the BLOCK (A) message indicates block_old_ sources for sources in set A and when an old state is EXCLUDE (X, Y) which indicates that sources in set Y are currently excluded from interfacing with the remote network element while sources in set X are currently allowed to interface with the remote network element then apply action:

(1) set (A−Y)=0 which indicates remove timer for sources in set A but not in set Y, where after applying the action the state transition table would have a new state EXCLUDE (X−A, A+Y) which indicates that sources in sets A and Y are currently excluded from interfacing with the remote network element and sources in set X but not in set A are currently allowed to interface with the remote network element.

* * * * *